US008908911B2

(12) United States Patent
Sweet, III et al.

(10) Patent No.: US 8,908,911 B2
(45) Date of Patent: Dec. 9, 2014

(54) REDUNDANT DETECTION FILTERING

(75) Inventors: Charles Wheeler Sweet, III, San Diego, CA (US); Prince Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 567 days.

(21) Appl. No.: 13/250,861

(22) Filed: Sep. 30, 2011

(65) Prior Publication Data

US 2012/0224773 A1 Sep. 6, 2012

Related U.S. Application Data

(60) Provisional application No. 61/449,363, filed on Mar. 4, 2011.

(51) Int. Cl.
*G06K 9/00* (2006.01)
*G06F 17/30* (2006.01)

(52) U.S. Cl.
CPC ................. *G06F 17/30247* (2013.01)
USPC ........... 382/103; 382/305; 382/218; 707/664; 707/692; 707/758; 707/772

(58) Field of Classification Search
CPC .......... G06K 9/00671; G06K 9/00624; G06K 9/00664; G06K 9/6202; G06K 9/6215; G06F 17/30244; G06F 17/30247; G06F 17/3028; G06F 17/30256; G06F 17/30259
USPC .......... 382/103, 305, 218; 707/664, 692, 758, 707/772, E17.019, E17.02
See application file for complete search history.

(56) References Cited

U.S. PATENT DOCUMENTS

| 6,504,571 | B1 * | 1/2003 | Narayanaswami et al. ................. 348/231.99 |
| 7,860,317 | B2 | 12/2010 | Xie et al. |
| 8,392,450 | B2 * | 3/2013 | Blanchflower et al. ........ 707/769 |
| 2007/0266252 | A1 * | 11/2007 | Davis et al. .................... 713/176 |
| 2008/0051997 | A1 * | 2/2008 | Rosenberg .................... 701/211 |
| 2008/0101723 | A1 * | 5/2008 | Kansal .......................... 382/284 |
| 2010/0034468 | A1 * | 2/2010 | Boncyk et al. ................ 382/217 |

(Continued)

FOREIGN PATENT DOCUMENTS

EP 0990997 A1 4/2000

OTHER PUBLICATIONS

Srinivasan, et al. "Performance characterization and optimization of mobile augmented reality on handheld platforms ." Workload Characterization, 2009. IISWC 2009. IEEE International Symposium on . (2009): 128-137. Print.*

(Continued)

*Primary Examiner* — Michael A Newman
(74) *Attorney, Agent, or Firm* — Kilpatrick Townsend & Stockton LLP

(57) ABSTRACT

Systems and methods are described herein for identifying and filtering redundant database entries associated with a visual search system. An example of a method of managing a database associated with a mobile device described herein includes identifying a captured image; obtaining an external database record from an external database corresponding to an object identified from the captured image; comparing the external database record to a locally stored database record; and locally discarding one of the external database record or the locally stored database record if the comparing indicates overlap between the external database record and the locally stored database record.

34 Claims, 8 Drawing Sheets

(56) References Cited

U.S. PATENT DOCUMENTS

| | | |
|---|---|---|
| 2010/0166321 A1 | 7/2010 | Sawant et al. |
| 2010/0260426 A1 | 10/2010 | Huang et al. |
| 2010/0309225 A1* | 12/2010 | Gray et al. .................... 345/633 |
| 2011/0032373 A1 | 2/2011 | Forutanpour et al. |

OTHER PUBLICATIONS

Wagner, et al. "Real-time Detection and Tracking for Augmented Reality on Mobile Phones." IEEE Transactions on Visualization and Computer Graphics. 16.3 (2010): 355-368. Print.*

Takacs, et al. "Outdoors Augmented Reality on Mobile Phone using Loxel-Based Visual Feature Organization." MIR'08. (2008): 1-8. Print.*

Lenting, H. Replicating augmented reality objects for mult-user interaction. MS thesis. University of Groningen, 2009. Print.*

International Search Report and Written Opinion—PCT/US2012/027591-ISA/EPO—Jul. 20, 2012.

Jaimes A et al., "Duplicate Detection in Consumer Photography and News Video", Proceedings ACM Multimedia 2002. 10th. International Conference on Multimedia. Juan-Les-Pins, France, Dec. 1-6, 2002; [ACM International Multimedia Conference], New York, NY: ACM, US, A vol. Conf. 10, Dec. 1, 2002, p. 423/424, XP001175040, DOI: 10.1145/641007.641098 ISBN: 978-1-58113-620-3 the whole document.

* cited by examiner

REDUNDANT DETECTION FILTERING

CROSS-REFERENCES TO RELATED APPLICATIONS

The present Application for Patent claims the benefit of U.S. Provisional Application Ser. No. 61/449,363, filed Mar. 4, 2011, and entitled "REDUNDANT DETECTION FILTERING." Said application is incorporated herein by reference in its entirety.

BACKGROUND

Wireless communication devices are incredibly widespread in today's society. For example, people use cellular phones, smart phones, personal digital assistants, laptop computers, pagers, tablet computers, etc. to send and receive data wirelessly from countless locations. Moreover, advancements in wireless communication technology have greatly increased the versatility of today's wireless communication devices, enabling users to perform a wide range of tasks from a single, portable device that conventionally required either multiple devices or larger, non-portable equipment.

As mobile handset capabilities and mobile network technology have advanced, users of mobile devices have been given an ever-increasing variety of ways to access information. For instance, visual search systems enable a user to retrieve information relating to one or more objects simply by capturing an image of said object(s). A visual search system can be utilized by an augmented reality (AR) system, and/or other suitable systems. An AR system can be employed to use cloud-based, visual search results to populate local target data from a larger set of targets. Visual search systems are typically cloud-based, such that information relating to objects in an image are retrieved from a remote server. Conventionally, these cloud-based visual search systems are optimized to return all relevant results. Further, cloud-based visual search systems are generally based on a stateless cloud-based database, which returns results for a given image without regard to user context. Thus, when utilizing cloud-assisted search to retrieve information relating to a detected visual target, multiple, similar targets may cause an associated AR system to detect, track and/or augment overlapping items. This leads to resource wastage and poor visual effect, e.g., as multiple redundant results are displayed. For example, redundant results may cause multiple redundant augmentations to be displayed for a given object.

SUMMARY

An example of a method of managing a database associated with a mobile device described herein includes identifying a captured image, obtaining an external database record from an external database corresponding to an object identified from the captured image, comparing the external database record to a locally stored database record, and locally discarding one of the external database record or the locally stored database record if the comparing indicates overlap between the external database record and the locally stored database record.

Implementations of the method may include one or more of the following features. The locally stored database record corresponds to an object of a previously captured image, the comparing includes comparing the object from the captured image to the object of the previously captured image, and the locally discarding includes at least one of electing not to locally store the external database record or discarding the locally stored database record if the object from the captured image exhibits more than a threshold degree of overlap with the object of the previously captured image. Comparing a first region of interest (ROI) associated with the object from the captured image to a second ROI of the object of the previously captured image. At least one of determining whether the first ROI overlaps the second ROI to at least a threshold degree, or determining whether a first centroid of the first ROI is within a threshold distance of a second centroid of the second ROI. Comparing a first pose associated with the object from the captured image to a second pose of the object of the previously captured image. The first pose includes at least one of position or orientation of the object from the captured image and the second pose includes at least one of position or orientation of the object of the previously captured image. Selecting a database record to locally discard from the external database record and the locally stored database record according to at least one of number of keypoints, resolution, number of matches between a corresponding input image and a reference image, or average pose error. The comparing includes comparing the external database record to the locally stored database record upon obtaining the external database record; and the locally discarding includes, if the comparing indicates overlap between the external database record and the locally stored database record, performing at least one of abstaining from locally storing the external database record; or replacing the locally stored database record with the external database record. Rendering an Augmented Reality (AR) augmentation corresponding to the object from the captured image. Obtaining a database associated with the locally stored database record from a remote source.

An example of a system for device database management described herein includes an image source configured to identify a captured image, a network interface communicatively coupled to the image source and configured to obtain an external database record from a remote server corresponding to an object identified from the captured image, a local database including a local database record, and a redundancy control module communicatively coupled to the network interface and the local database and configured to identify an extent of overlap between the external database record and the local database record and to locally discard one of the external database record or the local database record if the extent of overlap between the external database record and the local database record is greater than a threshold.

Implementations of the system may include one or more of the following features. The local database record corresponds to an object of a previously captured image, and the redundancy control module is further configured to compare the object from the captured image to the object of the previously captured image and to perform at least one of electing not to locally store the external database record or discarding the local database record if the object from the captured image exhibits greater than a threshold extent of overlap with the object of the previously captured image. The redundancy control module is further configured to compare a first ROI associated with the object from the captured image to a second ROI of the object of the previously captured image. The redundancy control module is further configured to perform at least one of determining whether the first ROI overlaps the second ROI to at least a threshold extent, or determining whether a first centroid of the first ROI is within a threshold distance of a second centroid of the second ROI. The redundancy control module is further configured to compare a first pose associated with the object from the captured image to a second pose of the object of the previously captured image. The first pose includes at least one of position or orientation of the object from the captured image and the second pose includes at least one of position or orientation of the object of the previously captured image. The redundancy control module is further configured to select a database record to locally discard from the external database record and the local database record according to at least one of number of keypoints, resolution, number of matches between a corresponding input image and a reference image, or average pose error. The redundancy control module is further configured to identify the extent of overlap between the external database record and the local database record upon obtaining the external database record and, if the extent of overlap is greater than the threshold, to perform at least one of abstaining from storing the external database record at the local database, or replacing the local database record in the local database with the external database record.

An example of a computing device as described herein includes image means configured to identify a captured image; communication means, communicatively coupled to the image means, configured to obtain an external database record from a remote server corresponding to an object identified from the captured image; storage means comprising a local database record; comparator means, communicatively coupled to the communication means and the storage means, configured to identify an extent of overlap between the external database record and the local database record; and filter means, communicatively coupled to the comparator means and the storage means, configured to locally discard one of the external database record or the local database record if the extent of overlap between the external database record and the local database record is greater than a threshold.

Implementations of the device may include one or more of the following features. The local database record corresponds to an object of a previously captured image, the comparator means is further configured to compare the object from the captured image to the object of the previously captured image, and the filter means is further configured to locally discard one of the external database record or the local database record if the object from the captured image exhibits greater than a threshold extent of overlap with the object of the previously captured image. The comparator means is further configured to compare a first ROI associated with the object from the captured image to a second ROI of the object of the previously captured image. The comparator means is further configured to perform at least one of determining whether the first ROI overlaps the second ROI to at least a threshold extent, or determining whether a first centroid of the first ROI is within a threshold distance of a second centroid of the second ROI. The comparator means is further configured to compare a first pose associated with the object from the captured image to a second pose of the object of the previously captured image. The first pose includes at least one of position or orientation of the object from the captured image and the second pose includes at least one of position or orientation of the object of the previously captured image. The filter means is further configured to select a database record to locally discard from the external database record and the local database record according to at least one of number of keypoints, resolution, number of matches between a corresponding input image and a reference image, or average pose error. The comparator means is further configured to identify the extent of overlap between the external database record and the local database record upon obtaining the external database record; and the filter means is configured, if the extent of overlap is greater than the threshold, to perform at least one of abstaining from storing the external database record at the storage means, or replacing the local database record stored in the storage means with the external database record.

An example of a computer program product as described herein resides on a processor-readable medium and includes processor-readable instructions configured to cause a processor to identify a captured image, obtain an external database record from an external database corresponding to an object identified from the captured image, compare the external database record to a locally stored database record, and locally discard one of the external database record or the locally stored database record if the comparing indicates overlap between the external database record and the locally stored database record.

Implementations of the computer program product may include one or more of the following features. The locally stored database record corresponds to an object of a previously captured image, the processor-readable instructions configured to cause the processor to compare are further configured to cause the processor to compare the object from the captured image to the object of the previously captured image, and the processor-readable instructions configured to cause the processor to locally discard are further configured to cause the processor to locally discard one of the external database record or the locally stored database record if the object from the captured image exhibits more than a threshold degree of overlap with the object of the previously captured image. The processor-readable instructions configured to cause the processor to compare are further configured to cause the processor to compare a first ROI associated with the object from the captured image to a second ROI of the object of the previously captured image. The processor-readable instructions configured to cause the processor to compare are further configured to cause the processor to perform at least one of determining whether the first ROI overlaps the second ROI to at least a threshold degree, or determining whether a first centroid of the first ROI is within a threshold distance of a second centroid of the second ROI. The processor-readable instructions configured to cause the processor to compare are further configured to cause the processor to compare a first pose associated with the object from the captured image to a second pose of the object of the previously captured image. The first pose includes at least one of position or orientation of the object from the captured image and the second pose includes at least one of position or orientation of the object of the previously captured image. The processor-readable instructions configured to cause the processor to locally discard are further configured to cause the processor to select a database record to locally discard from the external database record and the locally stored database record according to at least one of number of keypoints, resolution, number of matches between a corresponding input image and a reference image, or average pose error. The processor-readable instructions configured to cause the processor to compare are further configured to cause the processor to compare the external database record to the locally stored database record upon obtaining the external database record; and the processor-readable instructions configured to cause the processor to locally discard are further configured, if the comparing indicates overlap between the external database record and the locally stored database record, to cause the processor to perform at least one of abstaining from locally storing the external database record, or replacing the locally stored database record with the external database record.

DETAILED DESCRIPTION

Techniques are described herein for identifying and filtering redundant results of a visual search system. As described herein, a device that utilizes a cloud-based or network-based visual search system identifies and removes redundant targets from a list and/or local database of target objects to detect and/or track. An image associated with the device is captured, and respective objects in the image are identified. The cloud-based visual search database is then leveraged to obtain an external database record (e.g., an image stored by the cloud-based system that is determined by the system to most closely match the target object). This external database record is compared to a locally stored database record based on various criteria, as described herein. If the comparison results in identified overlap between the external and locally stored database records, one of the records is discarded. Techniques utilized to detect redundant visual search results described herein include, but are not limited to, comparison based on region of interest (ROI) and/or pose, comparative detection, etc.

Items and/or techniques described herein may provide one or more of the following capabilities, as well as other capabilities not mentioned. Local storage requirements associated with visual search applications can be reduced. Visual search results can be displayed with more relevant results and fewer redundancies. System resources associated with detecting and tracking redundant objects can be reduced or eliminated. A display associated with an augmented reality (AR) application can be streamlined to display fewer redundant augmentations. While at least one item/technique-effect pair has been described, it may be possible for a noted effect to be achieved by means other than that noted, and a noted item/technique may not necessarily yield the noted effect.

Figure 1:
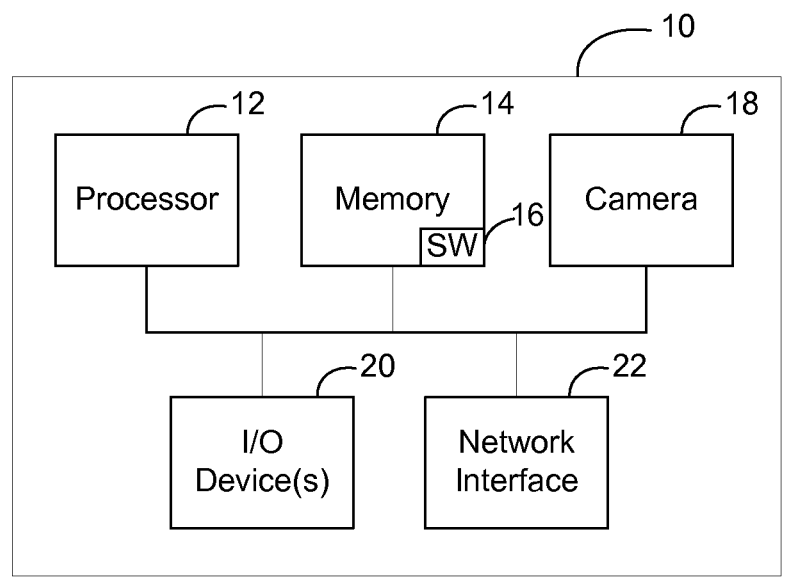
FIG. 1 is a block diagram of components of an example computing device.

Referring to FIG. 1, an example computing device 10 includes a processor 12, memory 14 including software 16, a camera 18, other input/output (I/O) device(s) 20 (e.g., a display, speaker, keypad, touch screen or touchpad, etc.), and a network interface 22. The network interface 22 provides communication functionality for the device 10 and facilitates bi-directional communication between the device 10 and one or more other network entities. The network interface 22 may include, or control and/or otherwise be associated with, transceivers, antennas, wired and/or wireless network adapters, that enable communication by the device 10 over various communication networks. These networks can utilize any suitable network technology or combination thereof including, but not limited to, wireless communication technologies such as cellular communication technologies such as 3G, 3G Long Term Evolution (LTE), cdma2000, or the like, Wi-Fi, Bluetooth, etc.; wired communication technologies; and/or any other suitable technology(s). The network interface 22 can be at least partially implemented by the processor 12 (e.g., based on software 16 stored on the memory 14) and/or by other components of the device 10 in hardware, software, or a combination of hardware and software.

The processor 12 is an intelligent hardware device, e.g., a central processing unit (CPU) such as those made by Intel® Corporation or AMD®, a microcontroller, an application specific integrated circuit (ASIC), etc. The memory 14 includes non-transitory storage media such as random access memory (RAM) and read-only memory (ROM). The memory 14 stores the software 16 which is computer-readable, computer-executable software code containing instructions that are configured to, when executed, cause the processor 12 to perform various functions described herein. Alternatively, the software 16 may not be directly executable by the processor 12 but is configured to cause the computer, e.g., when compiled and executed, to perform the functions.

The camera 18 is configured to capture one or more images via an electronic image sensor and/or other suitable means. The camera 18 may be an integrated component within the device 10, or alternatively the camera 18 can be an external device (e.g., a standalone digital camera, telescope, etc.) associated with the device 10 via the network interface 22 and/or a separate interface (e.g., Universal Serial Bus (USB), Video Graphics Array (VGA), an audio/video interface utilizing RCA connections, etc.) between the device 18 and the camera 18. Images captured by the camera 18 can be processed by the processor 12, stored on the memory 14, or passed via the network interface 22 to one or more other entities, as described herein. Further, while the camera 18 is illustrated in association with the device 10, the device 10 may additionally or alternatively use other image capture devices, such as a digital scanner, barcode scanner, etc., to obtain images as utilized herein.

The device 10 shown in FIG. 1 can be any suitable device with computing functionality, such as a mobile telephone, personal digital assistant (PDA), desktop or portable computer, etc. In general, the device 10 can be any portable and/or non-portable computing device that is capable of capturing images and communicating with one or more networks.

Figure 2:
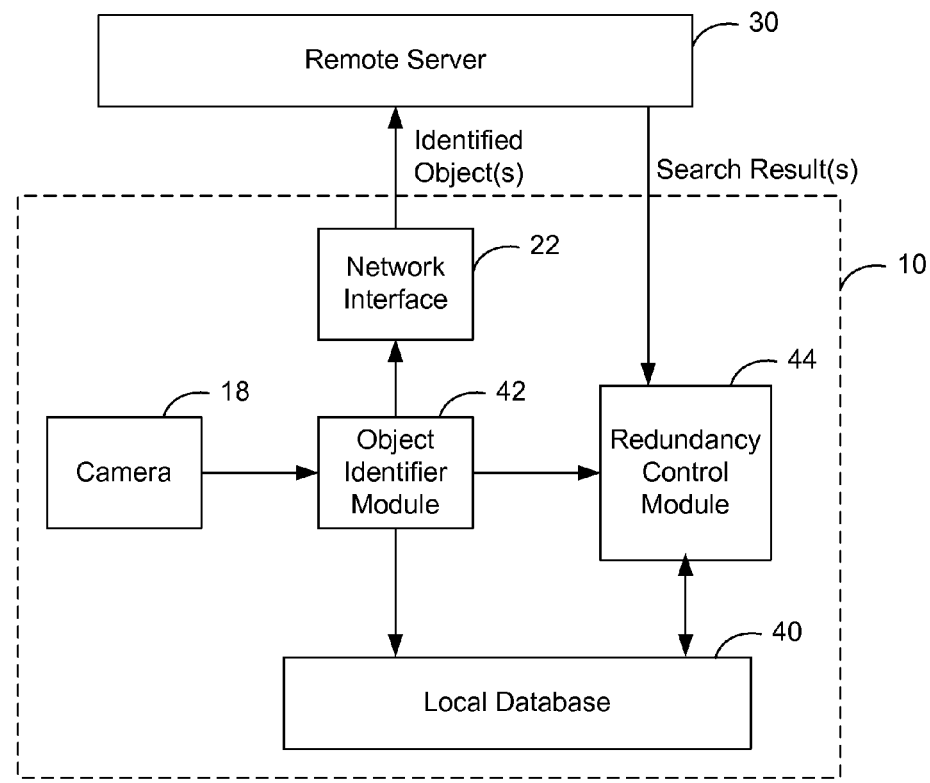
FIG. 2 is a block diagram of a system for filtering redundant objects associated with a visual search system.

Referring next to FIG. 2, a device 10 as described above can operate within a system including a remote server 30. By communicating with the remote server 30 via the network interface 22, the device 10 can leverage functionality of the remote server 30 for uses such as network- or cloud-assisted search or the like. Here, the remote server 30 is configured to provide cloud-based visual search functionality to the device 10. A camera 18 or other image capture mechanism at the device 10 is configured to obtain an image, and an object identifier module 42 processes the image to identify one or more objects contained therein. These object(s) are passed via a network interface 22 to the remote server 30, which returns search results relating to the passed object(s).

While FIG. 2 illustrates that object identification functionality is provided within the device 10, such functionality could additionally or alternatively be associated with the remote server 30. For instance, in a cloud-based visual search system, the object identifier module 42 may be associated with the remote server 30 instead of the device 10, such that images captured by the camera 18 are provided to the remote server 30 by the network interface 22. Upon receiving such images, the remote server 30 identifies object(s) from the captured images and returns visual search results corresponding to said object(s) as described above.

In general, cloud-based visual search systems are optimized to return all relevant results. Further, as such systems are generally stateless, results are generated returned for a given object based on the object itself without regard to user context. Thus, in the event that the device 10 attempts to obtain information relating to an identified target object using cloud-assisted search, the remote server 30 may return multiple, similar targets. This, in turn, may cause the device 10 to detect, track and/or augment multiple overlapping items. As a result, resource efficiency of the device 10 is reduced. Further, the relevance and quality of the search results utilized by the device 10 is reduced, which can result in a generally degraded user experience as well as poor visual effect (e.g., in the case of AR applications utilizing the search results) as the resulting object augmentations are not perfectly registered and/or overlapping. Additionally, extra computational power associated with the redundant results is consumed, which is wasted on tracking multiple items.

As further shown by FIG. 2, the device 10 can include a local database 40 that is configured to store a predefined number of search results. Search results stored in the local database 40 can be utilized for object detection and/or tracking, local caching of search results to expedite processing of frequently-identified objects, etc. In some use cases, there exists the possibility that multiple, similar reference targets exist in the local database 40. In this case, resources associated with the local database 40 can be optimized by removing the redundant targets from the local database 40 and/or other list(s) of targets to detect and/or track. This can be achieved at the device 10 via a redundancy control module 44 and/or other suitable means. The redundancy control module can be implemented in hardware and/or software, e.g., via a processor 12 executing instructions stored on a memory 14, etc.

Here, the redundancy control module 44 obtains entries from the local database 40 corresponding to one or more identified objects. Further, the redundancy control module 44 obtains respective search results returned by the remote server 30 based on the identified objects as conveyed to the remote server 30 via the network interface 22. The redundancy control module 44 is configured to identify redundancies between the local database entries and externally received search results. When a redundancy is found, the redundancy control module 44 is further configured to discard the redundant entry or entries in order to improve the visual search operation of the device 10. The redundancy control module 44 can utilize various techniques for identifying and filtering redundant objects, as explained in further detail below. Further, the redundancy control module 44 may be configured to analyze the redundant entries such that a "best" reference, as determined according to various criteria, is kept for future use.

In an example where the device 10 utilizes a cloud-based visual search system, redundancy control can be performed as follows. First, an image is captured (e.g., by camera 18) and respective objects in the image are identified (e.g., by object identifier module 42 located at the device 10 and/or the remote server 30). A cloud-based visual search database resident on the remote server 30 then processes the identified objects to obtain an external database record corresponding to the object. This record can include, e.g., an image stored by the cloud-based system that is determined by the system to most closely match the target object. The external database record is then compared by the redundancy control module 44 to a locally stored database record in one or more ways. If said comparing indicates overlap between the external and locally stored database records, one of the records is discarded.

Depending on the search space relating to a given target object, detection can be performed locally at the device 10 (e.g., based on entries within the local database 40) and/or remotely at the remote server 30. For instance, the local database 40 may store database records relating to a predetermined number of objects. These objects can be, e.g., recently identified objects, presently tracked objects, frequently detected objects, etc. Accordingly, once an image is captured and objects associated with the image are identified, a query of the local database 40 may be performed prior to, or in place of, submission of a search request to the remote server 30. In this manner, a two-detector system can be utilized where a local detection mechanism and a cloud-based detection mechanism operate together to provide visual search and AR functionality in an efficient manner.

As noted above, the redundancy control module can operate in a variety of manners to detect and filter redundant targets. For instance, the redundancy control module 44 can leverage Region of Interest (ROI), which depicts the outline of the target, by checking for significantly overlapping ROI between targets either detected or tracked. Alternatively, the redundancy control module 44 could check if the centroid and/or area of the ROI are significantly close to each other. As a second mechanism, the pose of the targets detected or tracked can be checked for similarity. Third, the targets can be checked if they detect against themselves. In this technique, one target is used as the reference and other targets are run as the input for detection against the reference. If detection is successful, the targets are deemed redundant and one target is removed. These techniques are described in further detail below.

Figure 3:
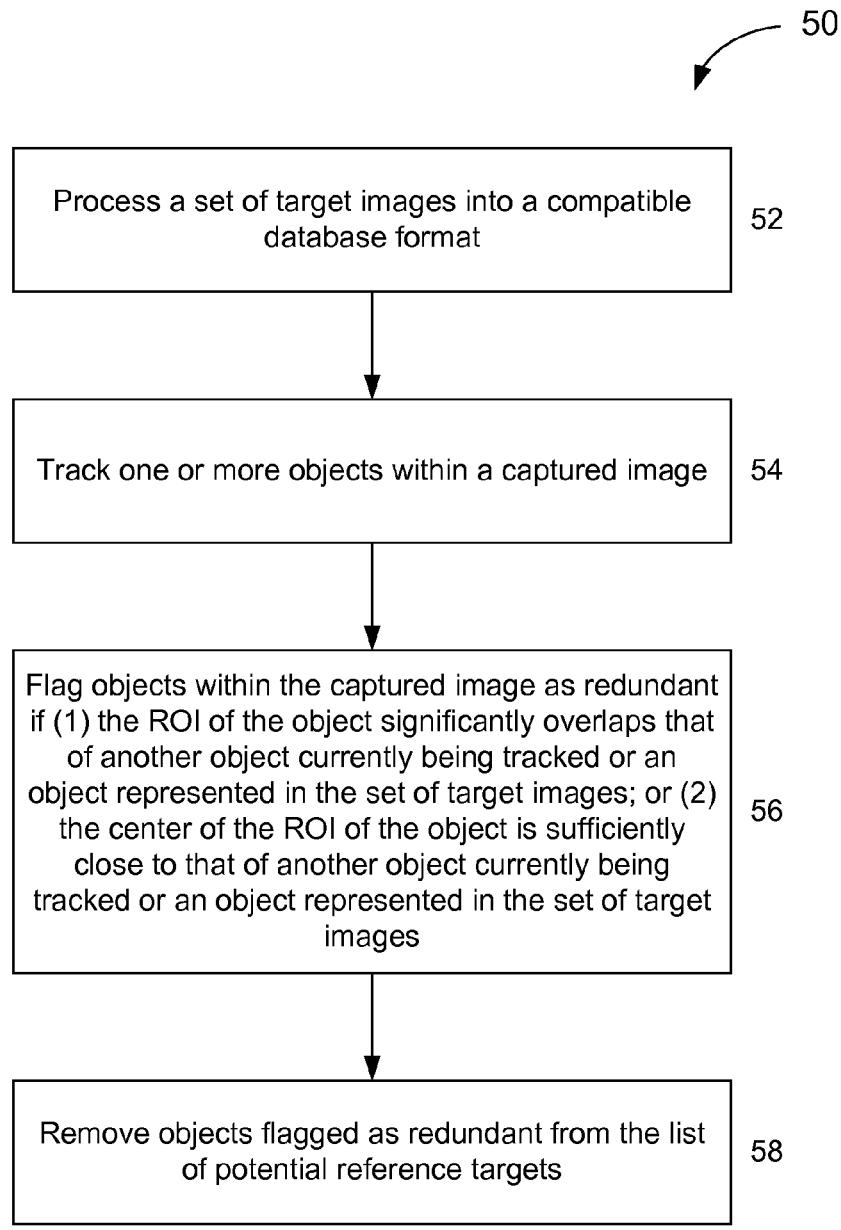
FIG. 3 is a block flow diagram of a process of filtering database objects based on region of interest (ROI).

With reference first to redundancy detection based on ROI, the redundancy control module 44 operates according to the process 50 shown in FIG. 3. The process 50 begins at stage 52, in which a set of target images is prepared and processed into a database format that is compatible with the local database 40 at the device 10. The local database 40 can be prepared locally, or alternatively the database could be prepared by an external entity and loaded to the device 10, e.g., via the network interface 22. For instance, in an example where the device 10 is a mobile phone, the local database 40 can be prepared by a computer and loaded to the phone via a connection to the computer. Additionally or alternatively, the local database 40 can be prepared external to the device 10 and downloaded by the device 10 over a network (e.g., Wi-Fi, 3G, etc.) via the network interface 22. As another alternative, the local database 40 could be prepared external to the device 10 and installed with one or more software components associated with the database. For instance, the local database 40 can be installed with an application that utilizes the local database 40 via the installation process for that application. As still another alternative, the local database 40 can be constructed by an application resident on the device 10 on an ongoing basis by building a database from images collected outside of the application. For instance, preview images from the camera 18 can be sent by the application to the remote server 30, which returns images similar to the target found in the camera preview.

Next, at stage 54, one or more objects within an image captured by the camera 18 are detected and tracked. Here, the object identifier module 42 (e.g., located at the device 10 and/or the remote server 30) initially detects object(s) within a given image from the camera 18. If an object is detected, the object is then tracked. Multiple objects can be detected and tracked concurrently.

Figure 4:
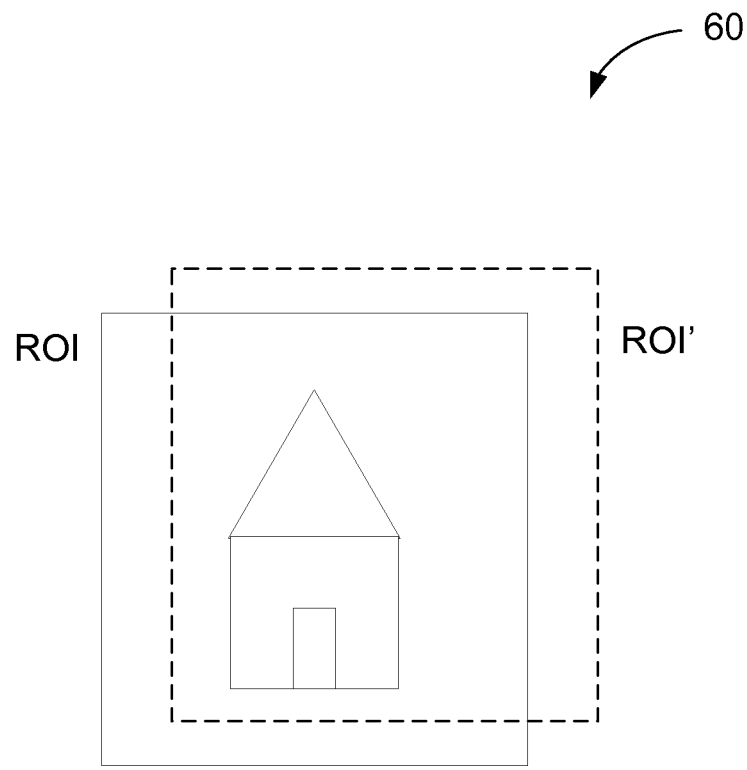
FIG. 4 is an illustrative view of an example ROI evaluation.

At stage 56, the redundancy control module 44 checks for redundant objects that were detected at stage 54. As shown in FIG. 3, redundancy detection at stage 56 can be conducted in a variety of manners. For instance, the redundancy control module 44 can check if the ROI of the newly detected object significantly (i.e., to at least a specified degree) overlaps another object currently being tracked or another object found in the current detection results. The ROI of a target is defined as an outline of the target (e.g., a rectangular region that includes the target, etc.). This technique is illustrated in further detail by diagram 60 in FIG. 4. Region ROI in diagram 60 corresponds to an object being tracked, while region ROI' corresponds to the ROI of a newly detected object. If regions ROI and ROI' are determined to overlap by at least a threshold degree, the two objects are flagged as redundant.

As additionally shown at stage 56, the redundancy control module 44 can calculate the center or centroid of the ROI of the newly detected object. If the calculated center or centroid is within a threshold distance from the center or centroid of another object currently being tracked or another object found in the current detection results, the object is flagged as redundant. An additional check may also be performed to compare the approximate areas of the respective ROIs.

If object(s) are deemed redundant at stage 56, objects flagged as redundant are removed from the potential list of reference targets at stage 58. Removal can be performed in a variety of manners, such as by removing the redundant object's keypoint descriptors from the local database 40 and/or by other means. Further, in the event that a newly detected object is determined to be redundant with an object stored in the local database 40, the redundancy control module 44 can selectively remove one of the redundant objects based on a variety of criteria. These criteria can include, but are not limited to, the number of keypoints in the respective objects, the resolution of the respective objects, the number of matching points between the objects and a reference, pose error of the respective objects, etc.

Figure 5:
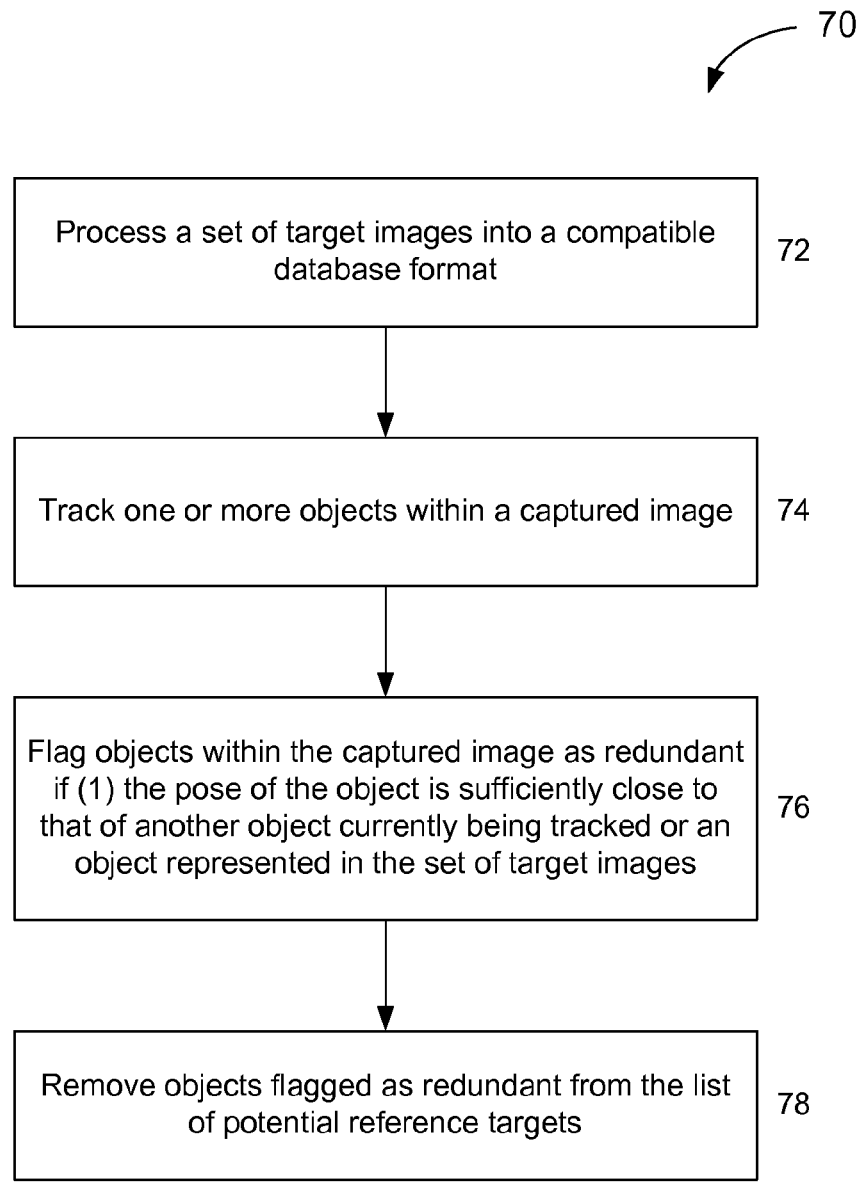
FIG. 5 is a block flow diagram of a process of filtering database objects based on pose.

As a more generalized case of the above ROI detection, the redundancy control module 44 can also filter redundant objects based on pose, as illustrated by process 70 in FIG. 5. The process 70 begins with database preparation at stage 72 and object tracking at stage 74, which are conducted in a similar manner to that described with respect to stages 52 and 54, respectively, in process 50. At stage 76, the redundancy control module 44 detects redundant objects by comparing the pose of newly detected objects to that of other currently detected objects and tracked objects to determine whether the poses are sufficiently close. If the poses are sufficiently close, the object is flagged as redundant, and the redundancy control module selectively removes the object at stage 78 in a similar manner to that described above with respect to stage 58 in process 50.

As used above, pose is defined as a 3×4 matrix that represents the rotation and translation of an object in the six degrees of freedom (e.g., with respect to three spatial axes and three orientation axes). The pose of an object can be taken into consideration as a whole, or alternatively the position and/or rotation can be compared independently with respect to one or more associated axes. The closeness between poses of different objects can be determined based on a distance metric and/or any other suitable technique.

As used above with respect to processes 50 and 70, pose error is defined as a fitting technique between a detected object and a corresponding reference object. For instance, pose error can be measured based on distance between keypoints of a detected object and those of the reference object. Some or all keypoints can be considered; as an example, one or more keypoints of a detected object can be discarded, and the remaining keypoints can be compared to corresponding keypoints of the reference object.

As another example technique that can be utilized by the redundancy control module 44, respective objects can be filtered based on comparative detection. This is shown in further detail by process 80 in FIG. 6. At stage 82, the local database 40 is constructed and processed as described above with respect to FIGS. 3 and 5. Next, at stage 84, an image (e.g., of a newly detected object) to be added to the local database 40 is identified. Before the image is added to the local database 40, it is used as a query image into the currently existing local database 40. Thus, at stage 86, it is determined whether the incoming query image sufficiently (e.g., within a threshold degree) matches another image already present in the local database 40. If the image to be added does not match against another item in the local database 40, it is added to the local database 40, as shown at stage 88. Otherwise, if the image to be added does match against another item in the local database 40, the image is discarded and not added to the local database 40, as shown at stage 90.

As noted above with reference to FIGS. 3-6, the redundancy control module 44 can utilize various techniques, such as ROI comparison, pose comparison and comparative detection, to filter redundant objects from the local database 40. Other techniques are also possible. Further, as described above, detection may occur with respect to objects received by the remote server 30 in response to processing the object(s), as in the case of ROI and pose comparison, and/or preemptively before the object(s) are processed, as in the case of comparative detection.

Figure 6:
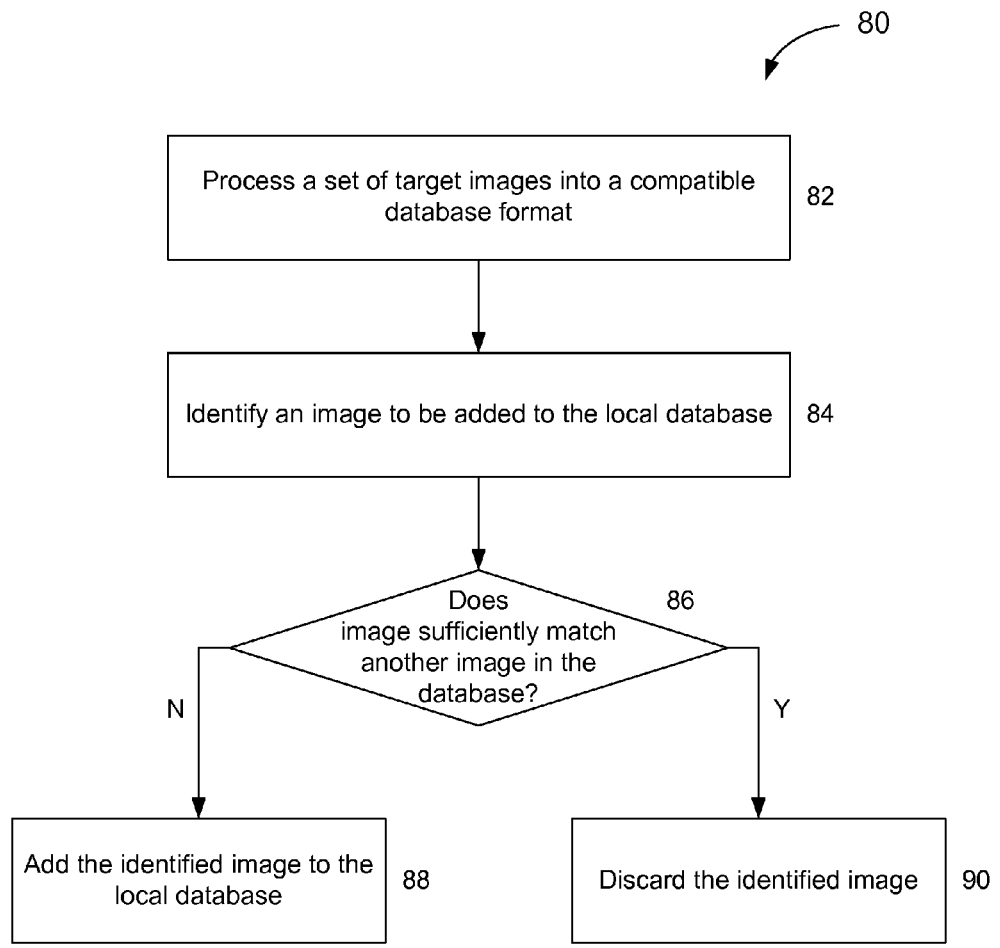
FIG. 6 is a block flow diagram of a process of filtering database objects based on comparative detection.

In addition, the components illustrated as associated with the device 10 in FIG. 2, as well as the processes described in FIGS. 3, 5 and 6, may be implemented via hardware, software, or a combination of hardware and software. For instance, some or all of the functionality described above can be implemented by a processor 12 executing software 16 stored on a memory 14.

Figure 7:
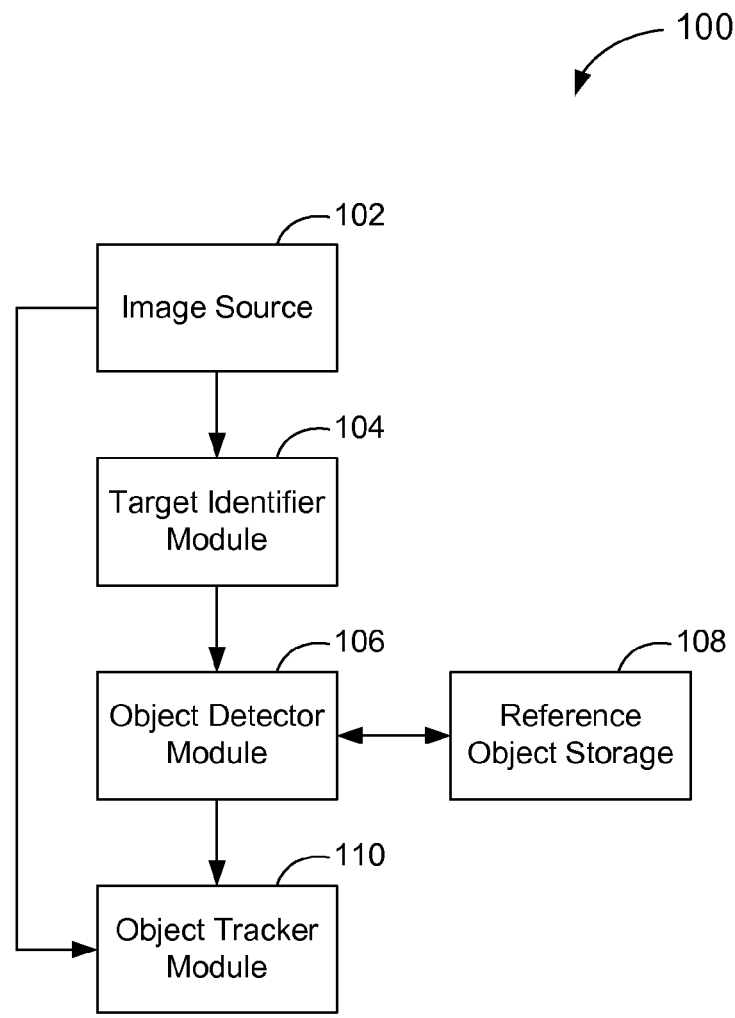
FIG. 7 is a block diagram of an example augmented reality (AR) system.

With reference next to FIG. 7, an example system 100 that implements an AR application is illustrated. The AR application processes images received from an image source 102, such as a camera or the like, and augments objects within the images to provide additional information to a user. The image source 102 can be implemented by, e.g., an external, head-mounted camera and/or any other suitable image source. The AR application can also be associated with a display, which can additionally be head-mounted using a common apparatus to the image source 102 and/or a separate apparatus. For instance, the AR application may be associated with a "true AR" system, which incorporates a head-mounted unit (e.g., glasses, helmet or other headwear, etc.) that includes the image source 102 and a display.

As shown by system 100, images from image source 102 are processed by an object detector module 104 to identify objects to be augmented within the image. These objects are, in turn, tracked by an object tracker module 106. The modules 106 can be implemented in any suitable manner, such as via a processor 12 executing software 16 stored on a memory 14 and/or by any other suitable means. Further, objects detected by the system 100, as well as other information relating to said objects, may be stored at a reference object storage 108 or another appropriate mechanism.

With regard to object detector module 104, detection is a computer vision process in which known targets are identified within a specific image. The object detector module 104 utilizes a set of references or targets, from which objects in the image are attempted to be identified. The reference for detection can consist of a set of points, which are represented with their two-dimensional position in the original image, and a descriptor for each keypoint. Descriptors can represent any suitable information, such as the gradient of the luminance information surrounding the keypoint. As another example, the image itself can be stored and used as a template for detection.

With regard to object tracker module 106, tracking operation can be initialized via the detection performed by the object detector module 104. This can be done by, e.g., passing the three-dimensional pose information generated by the object detector module 104 to the object tracker module 106. As noted above, the detection process produces points and relationships between the identified reference to the input image. Techniques are used, such as homography, to generate a pose representing the relationship between the two.

With further reference to the tracking operations performed by the object tracker module 106, tracking is a computer vision process used to follow previously identified targets within a specific image. The tracking process takes as input a sequence of images and uses information computed from each previous image to assist in computing point correspondences from the reference to the tracked target in the current image. Various tracking techniques utilize a template of the reference to correlate against. A template can be, e.g., the image itself or a subset of the image. In these techniques, the entire template, or subset(s) therein, can be correlated for tracking.

In AR, tracking is used to update rendered augmentations. This is done by, e.g., passing the pose information generated from the tracking process to the rendering process. More particularly, the tracking process produces point correspondences from the identified reference to the input image. Techniques are used, such as homography, to generate a pose representing the relationship between the two.

Figure 8:
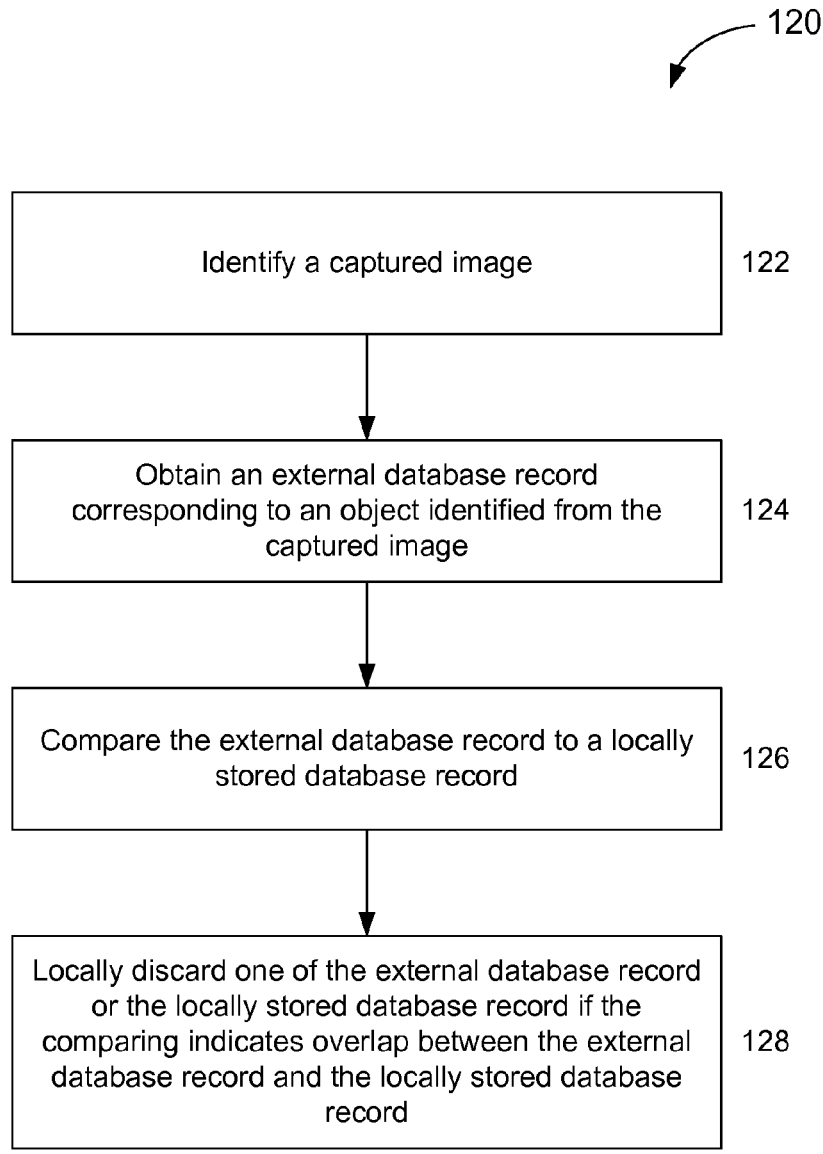
FIG. 8 is a block flow diagram of a process of managing local storage associated with a visual search system.

Referring to FIG. 8, with further reference to FIGS. 1-7, a process 120 of managing local storage associated with a visual search system includes the stages shown. The process 120 is, however, an example only and not limiting. The process 120 can be altered, e.g., by having stages added, removed, rearranged, combined, and/or performed concurrently. Still other alterations to the process 120 as shown and described are possible.

At stage 122, a captured image is identified. The image may be obtained from an image capture device such as a camera 18 or the like. At stage 124, an external database record corresponding to an object identified from the captured image identified at stage 122 is obtained (e.g., via a network interface 22) from an external database (e.g., associated with a remote server 30 or the like). Said object can be identified by, e.g., an object identifier module 42, which may be implemented at the device (e.g., via processor 12, based on instructions stored in memory 14) and/or the remote server 30. At stage 126, the external database record obtained at stage 124 is compared to a locally stored database record, e.g., a record stored at the local database 40. The comparison at stage 126 can be performed by a redundancy control module (e.g., implemented via a processor 12 executing instructions stored on a memory 14) or the like, and may be conducted via ROI comparison, pose comparison, comparative detection, and/or other techniques as described above. The process 120 then concludes at stage 128, in which one of the external database record or the locally stored database record is discarded if the comparison performed at stage 126 indicates overlap between said records.

One or more of the components, steps, features and/or functions illustrated in FIGS. 1, 2, 3, 4, 5, 6, 7 and/or 8 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2 and/or 7 may be configured to perform one or more of the methods, features, or steps described in FIGS. 3, 5, 6 and/or 8. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium," "computer-readable medium," and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium," "computer-readable medium," and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method of managing a database associated with a mobile device, the method comprising:
    identifying a captured image;
    identifying an object from the captured image;
    obtaining an external database record from an external database corresponding to the object identified from the captured image;
    obtaining a locally stored database record corresponding to the object identified from the captured image;
    comparing the external database record to the locally stored database record; and
    locally discarding one of the external database record or the locally stored database record, in response to determining overlap between the external database record and the locally stored database record.

2. The method of claim 1 wherein:
    the locally stored database record further corresponds to an object of a previously captured image;
    the comparing further comprises comparing the object from the captured image to the object of the previously captured image; and
    the locally discarding comprises at least one of electing not to locally store the external database record or discarding the locally stored database record, in response to determining the object from the captured image exhibits more than a threshold degree of overlap with the object of the previously captured image.

3. The method of claim 2 wherein the comparing further comprises comparing a first region of interest (ROI) associated with the object from the captured image to a second ROI of the object of the previously captured image.

4. The method of claim 3 wherein the comparing further comprises at least one of:
    determining whether the first ROI overlaps the second ROI to at least a threshold degree; or
    determining whether a first centroid of the first ROI is within a threshold distance of a second centroid of the second ROI.

5. The method of claim 2 wherein the comparing further comprises comparing a first pose associated with the object from the captured image to a second pose of the object of the previously captured image.

6. The method of claim 5 wherein the first pose comprises at least one of position or orientation of the object from the captured image and the second pose comprises at least one of position or orientation of the object of the previously captured image.

7. The method of claim 2 wherein the locally discarding further comprises selecting a database record to locally discard from the external database record and the locally stored database record according to at least one of number of keypoints, resolution, number of matches between a corresponding input image and a reference image, or average pose error.

8. The method of claim 1 wherein:
    the comparing comprises comparing the external database record to the locally stored database record upon obtaining the external database record; and
    the locally discarding comprises, in response to determining overlap between the external database record and the locally stored database record, performing at least one of:
        abstaining from locally storing the external database record; or
        replacing the locally stored database record with the external database record.

9. The method of claim 1 further comprising rendering an Augmented Reality (AR) augmentation corresponding to the object from the captured image.

10. The method of claim 1 further comprising obtaining a database associated with the locally stored database record from a remote source.

11. A system for device database management, the system comprising:
    an image source configured to identify a captured image;
    a network interface communicatively coupled to the image source and configured to obtain an external database record from a remote server corresponding to an object identified from the captured image;
    a local database comprising a local database record corresponding to the object identified from the captured image; and
    a redundancy control module communicatively coupled to the network interface and the local database and configured to identify an extent of overlap between the external database record and the local database record and to locally discard one of the external database record or the local database record, in response to determining the extent of overlap between the external database record and the local database record is greater than a threshold.

12. The system of claim 11 wherein:
    the local database record further corresponds to an object of a previously captured image; and
    the redundancy control module is further configured to compare the object from the captured image to the object of the previously captured image and to perform at least one of electing not to locally store the external database record or discarding the local database record, in response to determining the object from the captured image exhibits greater than a threshold extent of overlap with the object of the previously captured image.

13. The system of claim 12 wherein the redundancy control module is further configured to compare a first region of interest (ROI) associated with the object from the captured image to a second ROI of the object of the previously captured image.

14. The system of claim 13 wherein the redundancy control module is further configured to perform at least one of:
    determining whether the first ROI overlaps the second ROI to at least a threshold extent; or
    determining whether a first centroid of the first ROI is within a threshold distance of a second centroid of the second ROI.

15. The system of claim 12 wherein the redundancy control module is further configured to compare a first pose associated with the object from the captured image to a second pose of the object of the previously captured image.

16. The system of claim 15 wherein the first pose comprises at least one of position or orientation of the object from the captured image and the second pose comprises at least one of position or orientation of the object of the previously captured image.

17. The system of claim 12 wherein the redundancy control module is further configured to select a database record to locally discard from the external database record and the local database record according to at least one of number of keypoints, resolution, number of matches between a corresponding input image and a reference image, or average pose error.

18. The system of claim 11 wherein the redundancy control module is further configured to identify the extent of overlap between the external database record and the local database record upon obtaining the external database record and, in response to determining the extent of overlap is greater than the threshold, to perform at least one of
abstaining from storing the external database record at the local database; or
replacing the local database record in the local database with the external database record.

19. A computing device comprising:
image means configured to identify a captured image;
communication means, communicatively coupled to the image means, configured to obtain an external database record from a remote server corresponding to an object identified from the captured image;
storage means comprising a local database record corresponding to the object identified from the captured image;
comparator means, communicatively coupled to the communication means and the storage means, configured to identify an extent of overlap between the external database record and the local database record; and
filter means, communicatively coupled to the comparator means and the storage means, configured to locally discard one of the external database record or the local database record, in response to determining the extent of overlap between the external database record and the local database record is greater than a threshold.

20. The device of claim 19 wherein:
the local database record further corresponds to an object of a previously captured image;
the comparator means is further configured to compare the object from the captured image to the object of the previously captured image; and
the filter means is further configured to locally discard one of the external database record or the local database record, in response to determining the object from the captured image exhibits greater than a threshold extent of overlap with the object of the previously captured image.

21. The device of claim 20 wherein the comparator means is further configured to compare a first region of interest (ROI) associated with the object from the captured image to a second ROI of the object of the previously captured image.

22. The device of claim 21 wherein the comparator means is further configured to perform at least one of:
determining whether the first ROI overlaps the second ROI to at least a threshold extent; or
determining whether a first centroid of the first ROI is within a threshold distance of a second centroid of the second ROI.

23. The device of claim 20 wherein the comparator means is further configured to compare a first pose associated with the object from the captured image to a second pose of the object of the previously captured image.

24. The device of claim 23 wherein the first pose comprises at least one of position or orientation of the object from the captured image and the second pose comprises at least one of position or orientation of the object of the previously captured image.

25. The device of claim 20 wherein the filter means is further configured to select a database record to locally discard from the external database record and the local database record according to at least one of number of keypoints, resolution, number of matches between a corresponding input image and a reference image, or average pose error.

26. The device of claim 19 wherein:
the comparator means is further configured to identify the extent of overlap between the external database record and the local database record upon obtaining the external database record; and
the filter means is configured, in response to determining the extent of overlap is greater than the threshold, to perform at least one of:
abstaining from storing the external database record at the storage means; or
replacing the local database record stored in the storage means with the external database record.

27. A computer program product residing on a non-transitory processor-readable medium and comprising processor-readable instructions configured to cause a processor to:
identify a captured image;
identify an object from the captured image;
obtain an external database record from an external database corresponding to the object identified from the captured image;
obtain a locally stored database record corresponding to the object identified from the captured image;
compare the external database record to the locally stored database record; and
locally discard one of the external database record or the locally stored database record, in response to determining overlap between the external database record and the locally stored database record.

28. The computer program product of claim 27 wherein:
the locally stored database record further corresponds to an object of a previously captured image;
the processor-readable instructions configured to cause the processor to compare are further configured to cause the processor to compare the object from the captured image to the object of the previously captured image; and
the processor-readable instructions configured to cause the processor to locally discard are further configured to cause the processor to locally discard one of the external database record or the locally stored database record, in response to determining the object from the captured image exhibits more than a threshold degree of overlap with the object of the previously captured image.

29. The computer program product of claim 28 wherein the processor-readable instructions configured to cause the processor to compare are further configured to cause the processor to compare a first region of interest (ROI) associated with the object from the captured image to a second ROI of the object of the previously captured image.

30. The computer program product of claim 29 wherein the processor-readable instructions configured to cause the processor to compare are further configured to cause the processor to perform at least one of:
determining whether the first ROI overlaps the second ROI to at least a threshold degree; or
determining whether a first centroid of the first ROI is within a threshold distance of a second centroid of the second ROI.

31. The computer program product of claim 28 wherein the processor-readable instructions configured to cause the processor to compare are further configured to cause the processor to compare a first pose associated with the object from the captured image to a second pose of the object of the previously captured image.

32. The computer program product of claim 31 wherein the first pose comprises at least one of position or orientation of the object from the captured image and the second pose comprises at least one of position or orientation of the object of the previously captured image.

33. The computer program product of claim 28 wherein the processor-readable instructions configured to cause the processor to locally discard are further configured to cause the processor to select a database record to locally discard from the external database record and the locally stored database record according to at least one of number of keypoints, resolution, number of matches between a corresponding input image and a reference image, or average pose error.

34. The computer program product of claim 27 wherein:
the processor-readable instructions configured to cause the processor to compare are further configured to cause the processor to compare the external database record to the locally stored database record upon obtaining the external database record; and
the processor-readable instructions configured to cause the processor to locally discard are further configured, in response to determining overlap between the external database record and the locally stored database record, to cause the processor to perform at least one of:
abstaining from locally storing the external database record; or
replacing the locally stored database record with the external database record.

* * * * *